April 20, 1954  E. K. LOFTON  2,675,592
BELT CONNECTOR
Filed April 26, 1950

INVENTOR.
EDGAR K. LOFTON
BY
ATT'Y.

Patented Apr. 20, 1954

2,675,592

UNITED STATES PATENT OFFICE 2,675,592

BELT CONNECTOR

Edgar K. Lofton, Dayton, Ohio, assignor to The Dayton Rubber Company, a corporation of Ohio Application April 26, 1950, Serial No. 158,249

2 Claims. (Cl. 24—33)

This invention relates to belt connectors and particularly to an improved belt connector having an increased life and which is readily assembled.

Belt connectors of the general type with which the present invention is concerned are described and claimed in Patent No. 2,219,399 dated October 29, 1940. In connectors of this type curved straps are clamped or otherwise fastened to the belt ends by means of nails or similar fastening members which pass through the straps and the belt ends. Bearings are positioned within loops formed in the straps and these bearings are linked by means of pins or pintles and link members to form a flexible connection between the belt ends. In this type of construction the heads of the fastening members project above the clamps and when these belts are in operation, as for example under railroad cars where space is limited, there is the possibility that the outer surface of the belt and its associated connector may strike adjacent structural members particularly upon slackening of the belt, or by movement of resilient mounts commonly used for supporting generators which are driven by these belts. It has been found that this tendency causes the projecting heads of the fastening members to abrade and wear or break off which results in ultimate loosening of the connector and separation of the belt. It has further been found that the motion of the link members tends to produce lateral wear on the bearings with the result that the links tend to rub against the clamping members producing excessive wear and possible breakage of the links.

It is therefore an object of the present invention to provide a fastener for open end or non-endless type belts which may be readily assembled and in which the individual parts are readily replaced.

It is a further object of the present invention to provide a novel belt fastener in which the heads of the fastening members are protected against abrasion or breakage and in which the lateral wear of the bearings is minimized or uniformly distributed in such a manner that contact between linking member and clamp is avoided. These and other objects and advantages will appear from the following description of the invention taken in connection with the drawings wherein.

Figure 1:
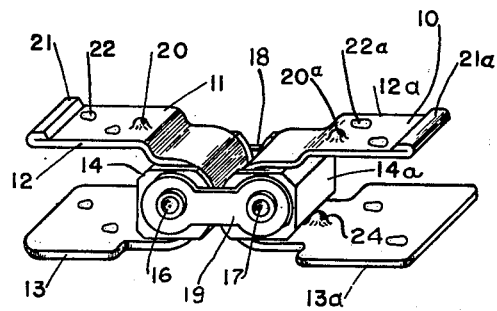
Figure 1 is a view in elevation showing the assembled belt connector.
Figure 2:
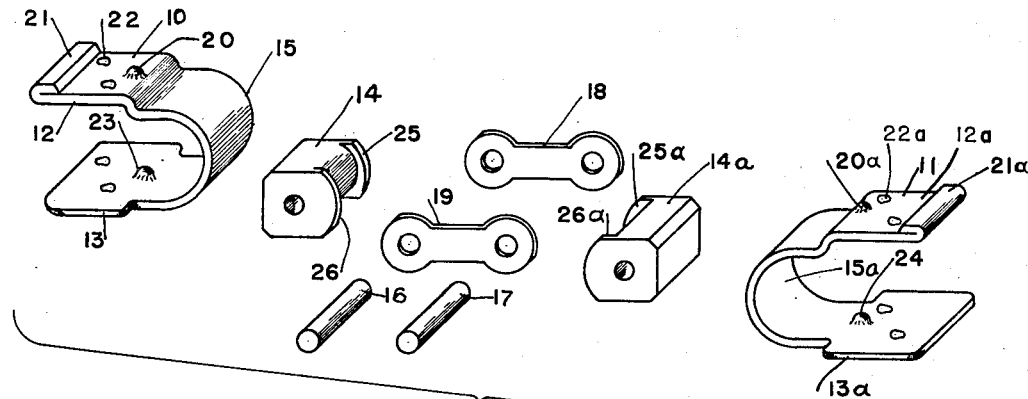
Figure 2 is a view in elevation showing the belt connector in disassembled or exploded form illustrating the structure of the individual parts thereof.

Referring to the drawings in detail, 10 and 11 illustrate the clamping members which are in the form of flat plates or straps of steel or other metal, each bent to form a loop having upper and lower belt embracing extensions 12 and 13 and 12a and 13a respectively. Within each loop are embraced bearings 14 and 14a through each of which pass pins or pintles 16 and 17 respectively. The pins and bearings are linked together by link members 18 and 19 through which pins 16 and 17 pass. The ends of the pins may be swaged or may be threaded to receive nuts as may be desired. The belt engaging portions of the straps are perforated as shown for example at 22 and 22a to receive belt fastening members such as nails, rivets, bolts or the like, which pass through these openings and through the belt ends and through corresponding openings in the bottom portions of the straps. The upper surfaces of the straps 12 and 12a are formed with spaced projections 20 and 21 and 20a and 21a, the purpose of which will be described hereinafter. These projections may be in the form of raised dimples as shown at 20 or in the form of a raised or bent over portion 21. For purpose of simplicity in manufacture, the dimples are formed internally of the strap as at 20 and 20a while the end of the strap is bent over to form raised portions 21 and 21a. The bearings are formed of any desired material and may be metal, fiber, synthetic resin, or the like. Preferably, the bearing is formed of a block of laminated fabric-synthetic resin composition of the Bakelite impregnated type which is cut from molded stock formed under pressure, and gives a durable wear-resistant bearing member. This block is drilled to accommodate the pins and is shaped to fit within loops 15 and 15a of the straps. The bearings are held in place by means of dimples 23 and 24 formed at the bottom portions of the strap members. When the straps are clamped against the belt ends the dimples firmly engage the bearing members and hold them in position. It has been found necessary to space the strap members from the linking members in order to prevent metal to metal contact caused by wear of the bearings and this is provided for in the present invention by constructing the bearing members with shoulders 25 and 26 and 25a and 26a which serve to space the straps from the links. At the same time a larger surface is provided over which frictional wear is distributed thus tending to increase the life of the bearing at the regions where the linking members cause the greatest wear.

Figure 3:
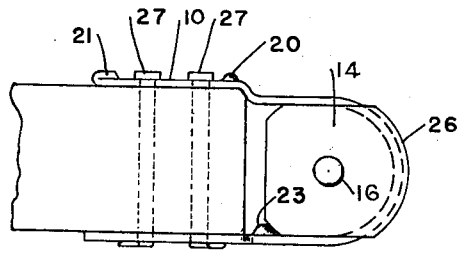
Figure 3 is a view in elevation of one section of the connector attached to a belt end.

In Figure 3 one portion of the connector is illustrated clamped to one end of a belt by means of rivets or nails 27 which pass through the upper and lower members of the strap 10. Projections 20 and 21 are designed to at least equal and preferably exceed the heights of the heads of the rivets or nails or the like in order to protect these heads from wear or breakage by contact with exposed members during rotation of the belt. The manner in which the bearing 14 is held in position by the raised portion of dimple 23 is also clearly illustrated.

It will be understood that I desire to comprehend within my invention such modifications as may be necessary to adapt it to varying conditions and uses.

Having thus described my invention what I claim as new and desire to secure by Letters Patent is:

I claim:

1. A belt connector comprising a pair of strap members each bent to form a loop and each having spaced end members adapted to receive the end of a belt, a pair of bearing members each positioned within said loop, and a pair of pin members each passing through one of said bearing members, said pin members being engaged at their opposite actual ends by link members connecting said pins, bearings and straps in a spaced relationship and each of said bearing members having projecting shoulders formed integrally therewith between which the loop of each strap member is positioned whereby the loops are spaced from the link members by said shoulders.

2. A belt connector comprising a pair of strap members each bent to form a loop and each having spaced end members adapted to receive the end of a belt, a pair of bearing members each positioned within said loop, and a pair of pin members each passing through one of said bearing members, said pin members being engaged at their opposite actual ends by link members connecting said pins, bearings and straps in a spaced relationship and each of said bearing members having projecting shoulders formed integrally therewith between which the loop of each strap member is positioned whereby the loops are spaced from the link members by said shoulders, and each of said bearing members being held in position by means of a raised portion integral with the bottom surface of its respective strap member.

References Cited in the file of this patent

UNITED STATES PATENTS

| Number | Name | Date |
|---|---|---|
| 841,252 | Jackson | Jan. 15, 1907 |
| 1,249,419 | Kinsler | Dec. 11, 1917 |
| 2,219,399 | Ritzert et al. | Oct. 29, 1940 |
| 2,330,449 | Reeves | Sept. 28, 1943 |
| 2,446,311 | Traxler | Aug. 3, 1948 |

FOREIGN PATENTS

| Number | Country | Date |
|---|---|---|
| 627,723 | France | June 14, 1927 |